E. B. PHELPS.
Gridiron.
No. 84,758.            Patented Dec. 8, 1868.
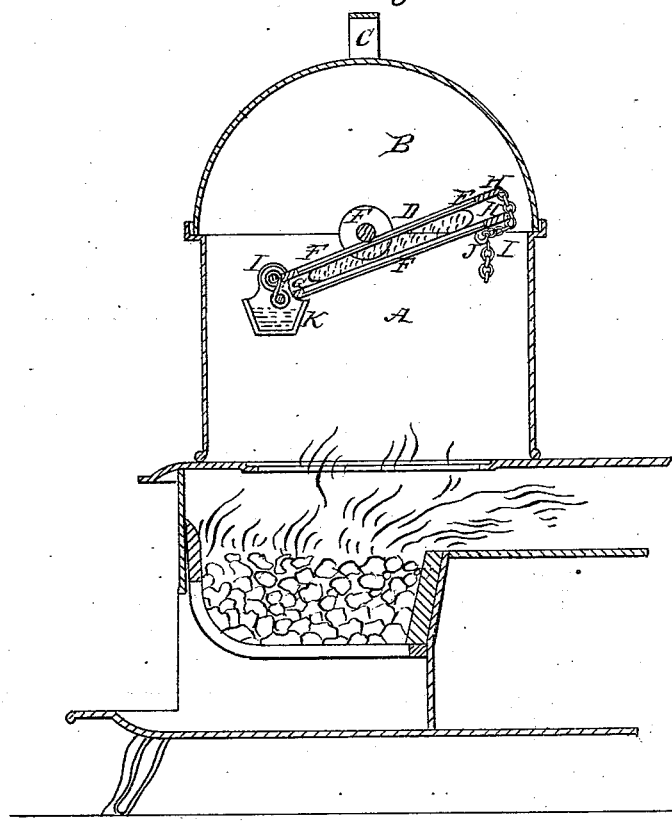
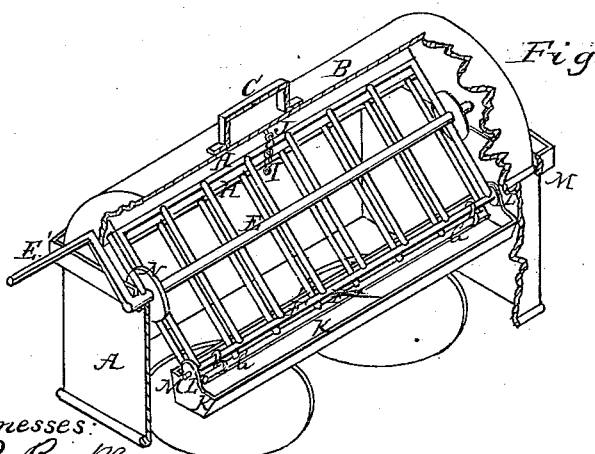
Witnesses:
R. Bockler
C. B. Thompson
Inventor.
E. B. Phelps.

UNITED STATES PATENT OFFICE.

EDWARD B. PHELPS, OF NEW YORK, N. Y.

Letters Patent No. 84,758, dated December 8, 1868.

---

GRIDIRON.

---

The Schedule referred to in these Letters Patent and making part of the same.

---

*To all whom it may concern:*

Be it known that I, EDWARD B. PHELPS, of the city, county, and State of New York, have made certain new and useful Improvements in Gridirons for broiling meat; and I do hereby declare that the following is a full, clear, and exact description of the same, reference being had to the accompanying drawings, making parts of this specification, in which—

Figure 1 represents a perspective view of my improvements.

Figure 2 is a vertical cross-section of the same.

Similar letters of reference indicate corresponding parts in the several figures.

The nature of this invention consists—

First, in constructing the gridiron of two flat frames, between which the meat is secured, provided with a central axle or with trunnions, for it to vibrate upon, and the whole enclosed in a metal box, to keep the heat together around the meat while in use, whereby a gridiron is had which can be manufactured for less cost, and can be handled more readily than those now in use.

Second, it consists in providing reversible gridirons, with a trough, pendent, or hinged to the iron in a manner to collect the gravy or juice of the meat being broiled, whereby the gravy is retained and saved, and assists to broil the meat with good flavor, and is prevented from wasting into the fire, and thereby smoking the meat and injuring its flavor.

To enable others skilled in the art to make and use my invention, I will proceed to describe its construction and operation.

A represents the box or casing, by means of which the gridiron is enclosed, to retain the heat from the fire within the stove upon which the gridiron is used.

B is the top or cover of the box A, which is made loose from the box A, and provided with a handle, C, by which it can be removed.

D represents the gridiron, which is constructed of two flat frames, F and F', of which the frame F is provided with a central axle, E, which rests in bearings in the box A.

The said axle E is extended to the outside of the box A, and there provided with an arm or crank, E', to oscillate the gridiron while used for broiling.

The aforesaid frame F' serves as a lid or apron to the frame F, to hold the meat upon it, and is hinged for that purpose, on its edge G, to the corresponding edge of the frame F.

Both the frames F and F' are made of corresponding size, of cast-metal or wire, or of both combined, in square form, of which, in each, the opposite edges or sides are connected by a number of bars, or wires, or grates, with equal spaces between the said grates.

The edges H H of the frames F and F', which are opposite to the edges hinged together, are secured to each other by means of a chain, I, attached to the frame F, and one of its links placed over the hook J, permanently secured on the edge of the frame F'.

K represents a trough or receiver, which is about the same length as the gridiron, and is loosely suspended on the hinged edge of the frame F, by means of having eyes, L L, formed on its ends, being fitted over short studs, M M, formed on the outer ends of the hinged edge of the frame F.

N is a projection or stop cast on the axle E, to prevent the gridiron being turned beyond a half revolution.

When the gridiron is used, the meat is simply placed between the frames F and F', and their edges H H secured together by means of the chain I and hook J, and the gridiron placed in the bearings, with its axle E in the box A.

In the trough K are put some water and some vegetables, if desirable, and the cover B is placed on the box A, and the whole set on the stove, over one of its openings in its top.

Now, as soon as the fire from the stove begins to operate well on the meat, the gridiron is vibrated from one side to the other by the arm E', to allow the fire to affect alike both sides of the meat, the trough K being suspended, so as to be always vertical on the lower part of the meat, and thereby collects the gravy from it, which, when being heated, sends its vapors to the meat, and in that manner assists the broiling of the meat, and gives it good flavor.

What I claim as my invention, and desire to secure by Letters Patent, is—

1. The combined frames F and F', with the central axle E, in connection with the trough K and stop N, operated and vibrated in the manner and for the purpose substantially as herein shown.

2. Providing reversible gridirons with a trough, K, to operate and to be used for the purpose herein described.

E. B. PHELPS.

Witnesses:
R. BOEKLEN,
THO. SADLER.